United States Patent
Kirihara et al.

(10) Patent No.: US 11,991,519 B2
(45) Date of Patent: May 21, 2024

(54) COMMUNICATION METHOD, COMMUNICATION SYSTEM, AUTHENTICATION APPARATUS AND USER TERMINAL DEVICE

(71) Applicant: NIPPON TELEGRAPH AND TELEPHONE CORPORATION, Tokyo (JP)

(72) Inventors: Takahito Kirihara, Musashino (JP); Satoshi Narikawa, Musashino (JP); Satoshi Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 765 days.

(21) Appl. No.: 17/059,107

(22) PCT Filed: May 17, 2019

(86) PCT No.: PCT/JP2019/019661
§ 371 (c)(1),
(2) Date: Nov. 25, 2020

(87) PCT Pub. No.: WO2019/230446
PCT Pub. Date: Dec. 5, 2019

(65) Prior Publication Data
US 2021/0227387 A1    Jul. 22, 2021

(30) Foreign Application Priority Data
May 30, 2018 (JP) .................................. 2018-103449

(51) Int. Cl.
*H04W 12/065* (2021.01)
*H04L 9/40* (2022.01)

(52) U.S. Cl.
CPC ........... *H04W 12/065* (2021.01); *H04L 63/08* (2013.01)

(58) Field of Classification Search
CPC .... H04W 12/065; H04W 28/20; H04L 63/08; H04L 12/44
See application file for complete search history.

(56) References Cited

U.S. PATENT DOCUMENTS 8,379,543 B2 * 2/2013 Gerszberg ........... H04L 12/2872
725/110
2008/0062988 A1 * 3/2008 Daigle .................... H04L 47/10
370/392

(Continued)

FOREIGN PATENT DOCUMENTS

CN    101009652 A  *  8/2007 ............. H04L 12/56
CN    103117960 A  *  5/2013 ............. H04L 12/911

(Continued)

OTHER PUBLICATIONS

Machine translation of CN 103117960 A, published May 22, 2013, p. 1-9.*

(Continued)

*Primary Examiner* — Christopher A Revak
(74) *Attorney, Agent, or Firm* — Harness, Dickey & Pierce, P.L.C.

(57) ABSTRACT

A communication method performed by a communication system including an authentication device and a subscriber line system includes: determining by the authentication device, in response to a request for communicative connection from a user terminal that establishes a communicative connection via the subscriber line system, whether the user terminal is allowed to establish the communicative connection; and controlling, by the subscriber line system, the communicative connection established by the user terminal, (Continued)

by dynamically allocating a bandwidth in accordance with a request from the user terminal based on a result of the determining.

12 Claims, 11 Drawing Sheets

(56) References Cited

U.S. PATENT DOCUMENTS

| | | | |
|---|---|---|---|
| 2019/0377569 A1* | 12/2019 | Harada | H04L 67/34 |
| 2020/0236617 A1* | 7/2020 | Kreiner | H04W 48/18 |
| 2021/0150584 A1* | 5/2021 | Volkovich | G06Q 30/0269 |

FOREIGN PATENT DOCUMENTS

| | | |
|---|---|---|
| JP | 200654694 A | 2/2006 |
| JP | 2006352468 A | 12/2006 |
| JP | 20085407 A | 1/2008 |
| JP | 2009219077 A | 9/2009 |
| WO | WO 2016/061782 * 4/2016 | H04B 10/071 |

OTHER PUBLICATIONS

[GE-PON technology] 4th GE-PON Systematization Function, NTT Technology Report, vol. 17, No. 11, 2005 pp. 59-61.
[GE-PON technology] Part 3 DBA Features, NTT Technology Report, vol. 17, No. 10, 2005 pp. 67-70.

* cited by examiner

COMMUNICATION METHOD, COMMUNICATION SYSTEM, AUTHENTICATION APPARATUS AND USER TERMINAL DEVICE

CROSS-REFERENCE TO RELATED APPLICATIONS

This application is a 371 U.S. National Phase of International Application No. PCT/JP2019/019661, filed on May 17, 2019, which claims priority to Japanese Application No. 2018-103449 filed on May 30, 2018. The entire disclosures of the above applications are incorporated herein by reference.

TECHNICAL FIELD

The present invention relates to a communication method, a communication system, an authentication device, and a user terminal.

BACKGROUND ART

When a user uses a network service, a user terminal may be communicatively connected to a network via a fiber-to-the-subscriber line. In this case, the user terminal is communicatively connected to the network via an Optical Network Unit (ONU, fiber-to-the-subscriber line terminating device) installed in a user's home and an Optical Line Terminal (OLT, fiber-to-the-subscriber line termination equipment) installed in a station. Once the ONU utilized for network connection is authenticated, the user terminal can be communicatively connected to the network without limitation, via the authenticated ONU (for example, see Non Patent Literature 1).

Examples of the above described user terminal include devices such as: a personal computer that is communicatively connected to the network via a wired medium; a smart phone and a tablet terminal communicatively connected to the network via a wireless medium; digital appliances such as 4K smart televisions and recorders; household appliances such as a refrigerators and air conditioners supporting a home network service; and Internet of Things (IoT) devices including sensor devices such as monitoring/watching cameras and remote door locks. Recent advancement of Information and Communication Technology (ICT) has resulted in wider variety of user terminals communicatively connected to the network with the number of such terminals increasing every year.

In response to the increase in the types and the number of the user terminals communicatively connected to the network, measures such as energy consumption reduction measures, including reduction of power consumption of the user terminals, and measures for preventing unauthorized connection by the user terminals are being more actively taken. Meanwhile, there is still room for improvement in terms of improving a method by which the user terminals are communicatively connected to the network. For example, it is currently difficult to provide network services that achieve authentication and dynamic bandwidth allocation enabling a required bandwidth to be allocated to a user terminal authorized to be connected, at a required time zone.

FIG. 11 is a schematic diagram illustrating a configuration of a known communication system. As illustrated in the figure, the communication system is configured to include a user terminal, a fiber-to-the-subscriber line system, a network, and an Internet service server. The fiber-to-the-subscriber line system is communicatively connected to the Internet service server via a network. The user terminal is connected to the fiber-to-the-subscriber line system, thereby being communicatively connected to the network.

As illustrated in FIG. 11, the fiber-to-the-subscriber line system is configured to include an ONU, a fiber-to-the-subscriber line section, and an OLT. The ONU is physically connected to the OLT via the fiber-to-the-subscriber line section. When the ONU is authenticated by an identification unit (e.g., based on a Logical Link Identifier (LLID)), communication between the OLT and the ONU via the fiber-to-the-subscriber line section is established. When the communication via the fiber-to-the-subscriber line section is established, the user terminal can be communicatively connected to the network without limitation by being connected to the ONU.

CITATION LIST

Non Patent Literature

Non Patent Literature 1: "Basic Technology Course [GE-PON Technology], 4th Session, GE-PON Systemization Function", NTT Technology Journal, pp. 59-61, November 2005

Non Patent Literature 2: "Basic Technology Course [GE-PON Technology], 3rd Session, DBA Function", NTT Technology Journal, pp. 67-70, October 2005

SUMMARY OF THE INVENTION

Technical Problem

According to this known technique, once the ONU is authenticated and communication via the fiber-to-the-subscriber line section is established, all user terminals connected to the ONU can be communicatively connected to the network without limitation. Thus, with the known technique, there is a problem that it is difficult to correctly determine whether each of the user terminals is allowed to be communicatively connected to the network.

While the types and the number of user terminal increase, there is a problem that, with the known technique, it is difficult to dynamically allocate a bandwidth corresponding to a request from a user terminal at a time zone corresponding to a request from the user terminal. For example, a typical known fiber-to-the-subscriber line system includes a Gigabit Ethernet-Passive Optical Network (GE-PON). GE-PON has a Dynamic Bandwidth Allocation (DBA) function (see NPL 2). Unfortunately, the DBA is a function of dynamically allocating bandwidths in accordance with the traffic amount on the uplink only. Thus, the GE-PON is unable to dynamically allocate the bandwidth corresponding to the request from the user terminal in the time zone corresponding to the request from the user terminal, or to dynamically allocate the bandwidth on the downlink.

In view of the above, an object of the present invention is to provide a technique enabling bandwidths to be dynamically allocated as requested.

Means for Solving the Problem

An aspect of the present invention is a communication method performed by a communication system including an authentication device and a subscriber line system, the method including: determining by the authentication device, in response to a request for communicative connection from a user terminal that establishes a communicative connection via the subscriber line system, whether the user terminal is allowed to establish the communicative connection; and controlling, by the subscriber line system, the communicative connection established by the user terminal, by dynamically allocating a bandwidth in accordance with a request from the user terminal based on a result of the determining.

An aspect of the present invention is the communication method described above further including performing periodical execution of the determining and the controlling.

An aspect of the present invention is the communication method described above, wherein the performing periodical execution is executed in response to the authentication device periodically confirming the user terminal about the request for the communicative connection by the user terminal.

An aspect of the present invention is the communication method described above, wherein the performing periodical execution is executed in response to the user terminal periodically requesting the authentication device for determining whether the communicative connection is allowed.

An aspect of the present invention is a communication system comprising: an authentication device configured to determine, in response to a request for communicative connection from a user terminal that establishes the communicative connection via a subscriber line system, whether the user terminal is allowed to establish the communicative connection; and a subscriber line system configured to control the communicative connection established by the user terminal, by dynamically allocating a bandwidth in accordance with a request from the user terminal based on a result of the determination.

An aspect of the present invention is an authentication device, wherein the authentication device is configured to perform an inquiry about an intention to maintain the communicative connection of a user terminal that establishes the communicative connection via a subscriber line system, and in a case where a result of the inquiry indicates the intention to maintain the communicative connection and the authentication device determines whether the communicative connection is maintainable, and a result of the determination indicates that the communicative connection is maintainable, the authentication device is configured to allow the user terminal to maintain the communicative connection, and otherwise the authentication device ends the communicative connection by the user terminal.

An aspect of the present invention is a user terminal, wherein the user terminal is configured to request an authentication device that is configured to determine whether communicative connection is allowed to be established via a subscriber line system, to determine whether the communicative connection is allowed to be established, in a case where a result of the determination indicates that the communicative connection is allowed, the user terminal maintains the communicative connection, and in a case where a result of the determination indicates that the communicative connection is not allowed, the user terminal ends the communicative connection.

Effects of the Invention

With the present invention, bandwidth can be dynamically allocated as requested.

DESCRIPTION OF EMBODIMENTS

Embodiments

Figure 1:
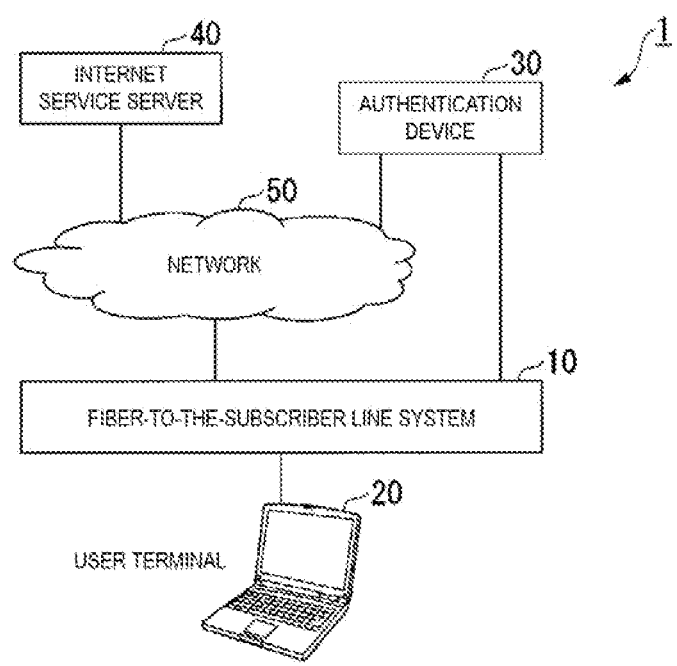
FIG. 1 is a diagram illustrating a configuration of the communication system 1 according to an embodiment of the present invention.

Hereinafter, an embodiment according to the present invention will be described.

Overview

An overview of an embodiment will be described below.

A communication system according to the embodiment described below determines whether a user terminal is allowed to be communicatively connected to a network. When the result of the determination is that communicative connection is not allowed, the communication system rejects the communicative connection of the user terminal to the network. When the result of the determination is that communicative connection is allowed, the communication system allows the user terminal to be communicatively connected to the network, and dynamically allocates a bandwidth corresponding to a request from the user terminal in a time zone corresponding to a request from the user terminal.

Specifically, the communication apparatus is configured to include a user terminal, a fiber-to-the-subscriber line system, a network, an authentication device, and an Internet service server. The fiber-to-the-subscriber line system is configured to include an ONU, a fiber-to-the-subscriber line section, and an OLT. The ONU is configured to include a plurality of identification units (for example, an identification unit A and an identification unit B).

The fiber-to-the-subscriber line system is connected to the authentication device and the Internet service server via a network. When the user terminal is connected to the ONU via a wired or wireless medium, in the communication apparatus, an authentication scheme starts for determining whether the user terminal is allowed to be communicatively connected to the network using a predetermined identification unit (for example, the identification unit A).

The authentication device determines whether the user terminal is allowed to be communicatively connected to the network in response to a notification received from the ONU. The authentication device notifies the ONU of the determination result via the OLT. When the determination result is that the communicative connection is not allowed, the ONU rejects the communicative connection of the user terminal to the network. When the determination result is that the communicative connection is allowed, the ONU allows the user terminal to be communicatively connected to the network, and notifies the other identification unit (for example, the identification unit B) of an instruction to establish connection of a new logical path corresponding to the request from the user terminal. Note that the request herein is a request for configuring a value of a communication parameter such as, for example, a bandwidth, a time zone, a low latency level, and a communication path.

When the identification unit B establishes the connection of the new logical path, the user terminal performs path switching so that network service can be utilized via the identification unit B.

With the above procedure, only user terminals allowed to be communicatively connected can be communicatively connected to the Internet service server via the fiber-to-the-subscriber line system and the network, to start using network services. The fiber-to-the-subscriber line system can dynamically allocate a bandwidth corresponding to a request from the user terminal in a time zone corresponding to the request from the user terminal.

Hereinafter, a communication system 1 according to an embodiment of the present invention will be described with reference to the drawings. Note that the embodiment described below is merely an example, and various modifications and improvements can be made based on knowledge of a person skilled in the art. Note that, in the specification and the drawings, the same reference numerals are assumed to denote the identical components.

Overall Configuration of Communication System

Hereinafter, an overall configuration of the communication system 1 will be described.

FIG. 1 is a diagram illustrating an overall configuration of the communication system 1 according to an embodiment of the present invention. As illustrated in the figure, the communication system 1 includes a fiber-to-the-subscriber line system 10, a user terminal 20, an authentication device 30, an Internet service server 40, and a network 50.

The fiber-to-the-subscriber line system 10 is communicatively connected to the authentication device 30 via a wired or wireless medium. Note that the fiber-to-the-subscriber line system 10 and the authentication device 30 may also be communicatively connected to each other via the network 50. The fiber-to-the-subscriber line system 10 is communicatively connected to the Internet service server 40 via the network 50. The user terminal 20 is communicatively connected to the fiber-to-the-subscriber line system 10 via a wired or wireless medium. When the user terminal 20 is connected to the fiber-to-the-subscriber line system 10, in the communication system, an authentication scheme starts for determining whether the user terminal 20 is allowed to be communicatively connected to the network.

The authentication device 30 determines whether the user terminal 20 is allowed to be communicatively connected to the network 50 based on connection information about the user terminal 20, in response to a notification from the fiber-to-the-subscriber line system 10.

Note that the connection information about the user terminal 20 includes, for example, terminal information (such as a Media Access Control (MAC) address), stored position information (such as building information, shelf number, and OLT information), and the like.

The authentication device 30 notifies the fiber-to-the-subscriber line system 10 of the result of determining whether the user terminal 20 is allowed to be communicatively connected to the network 50. When the notified determination result is that connection is not allowed, the fiber-to-the-subscriber line system 10 rejects the communicative connection of the user terminal 20 to the network 50. When the notified determination result is that connection is allowed, the fiber-to-the-subscriber line system 10 allows the user terminals 20 to be communicatively connected to the network 50.

Note that one example of the method of notifying the user terminal 20 of the result of determining whether communicative connection to the network 50 is allowed is a notification method using Operation Systems (OpS) via a monitoring network. However, this should not be construed in a limiting sense.

With the above procedure, only user terminals 20, which is allowed to be communicatively connected to the network 50, can be communicatively connected to the Internet service server 40 via the fiber-to-the-subscriber line system 10 and the network 50, to use network services. The fiber-to-the-subscriber line system 10 can dynamically allocate a bandwidth corresponding to a request from the user terminal 20 in a time zone corresponding to the request from the user terminal 20.

Configuration of Fiber-to-the-subscriber Line System

Hereinafter, the configuration of the fiber-to-the-subscriber line system 10 will be described more in detail.

Figure 2:
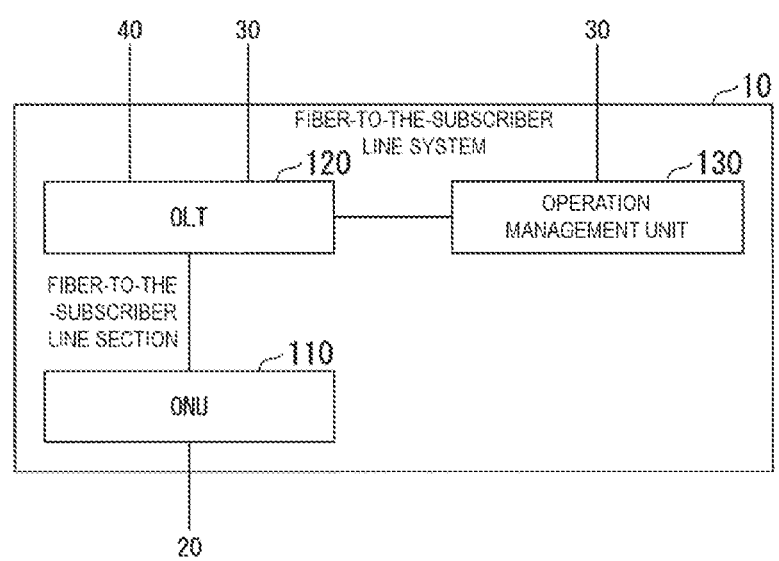
FIG. 2 is a block diagram illustrating a configuration of a fiber-to-the-subscriber line system 10 according to an embodiment of the present invention.

FIG. 2 is a block diagram illustrating a configuration of the fiber-to-the-subscriber line system 10 according to an embodiment of the present invention. As illustrated, the fiber-to-the-subscriber line system 10 is configured to include an ONU 110, an OLT 120, and an operation management unit 130.

The ONU 110 is communicatively connected to the OLT 120 via the fiber-to-the-subscriber line section. The ONU 110 is also communicatively connected to the user terminal 20 via a wired or wireless medium.

The OLT 120 is communicatively connected to the ONU 110 via the fiber-to-the-subscriber line section. The OLT 120 is also communicatively connected to the authentication device 30 and the Internet service server 40 via the network 50. The OLT 120 is also communicatively connected to the operation management unit 130.

The operation management unit 130 is communicatively connected to the OLT 120. The operation management unit 130 is also communicatively connected to the authentication device 30. Note that the operation management unit 130 and the authentication device 30 may be communicatively connected to each other via the network 50.

Configuration of ONU

Hereinafter, the configuration of the ONU 110 will be described more in detail.

Figure 3:
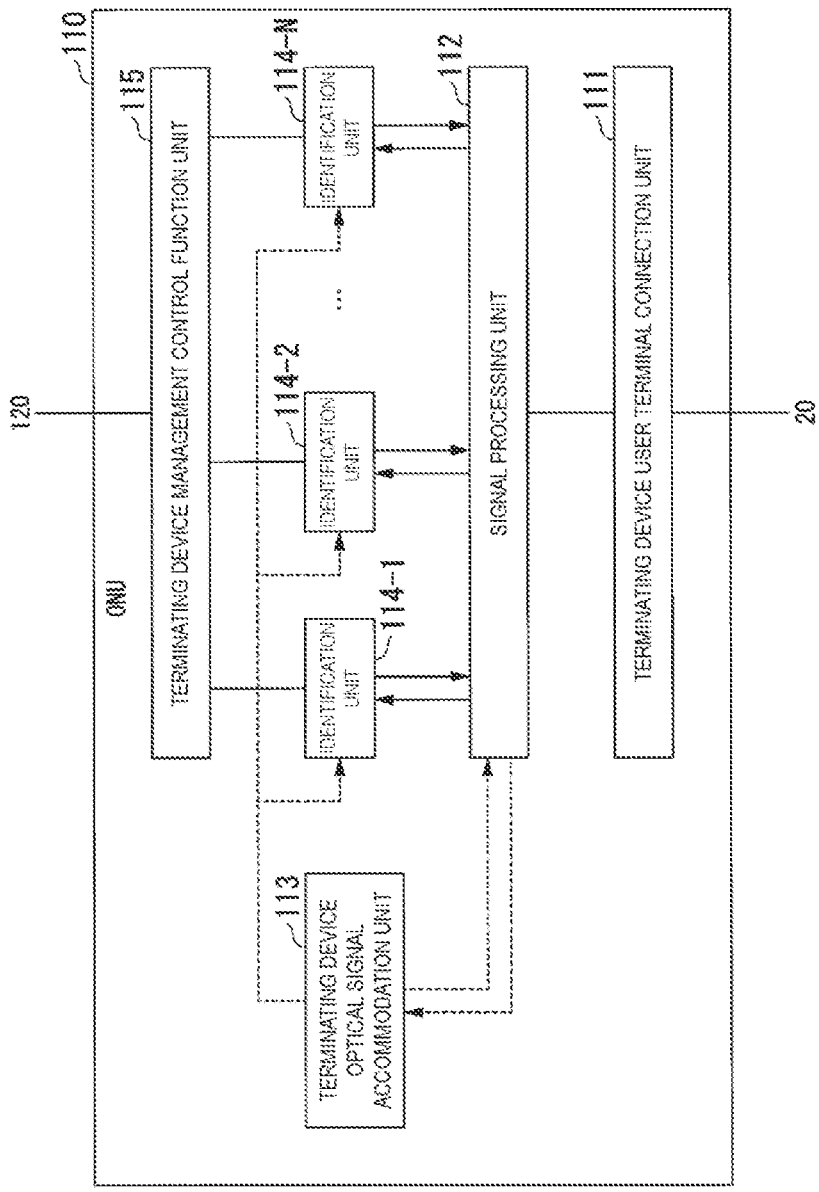
FIG. 3 is a block diagram illustrating a configuration of an ONU 110 of the fiber-to-the-subscriber line system 10 according to an embodiment of the present invention.

FIG. 3 is a block diagram illustrating a configuration of the ONU 110 of the fiber-to-the-subscriber line system 10 according to an embodiment of the present invention. As illustrated in the figure, the ONU 110 includes a terminating device user terminal connection unit 111, a signal processing unit 112, a terminating device management control function unit 113, an identification unit 114 (114-1, 114-2, . . . , and 114-N (N is an integer that is equal to or larger than 2)), and a terminating device optical signal accommodation unit 115.

The terminating device user terminal connection unit 111 is communicatively connected to the user terminal 20 via a wired or wireless medium. The terminating device user terminal connection unit 111 is connected to the signal processing unit 112.

The signal processing unit 112 is connected to the terminating device user terminal connection unit 111. Furthermore, the signal processing unit 112 is communicatively connected to the terminating device optical signal accommodation unit 115 to be paired via the N identification units 114 (114-1 to 114-N). The signal processing unit 112 is communicatively connected to the terminating device management control function unit 113.

The terminating device management control function unit 113 is communicatively connected to the signal processing unit 112. The terminating device management control function unit 113 is communicatively connected to each of the N identification units 114 (114-1 to 114-N). The terminating device management control function unit 113 is configured to include a processor such as a Central Processing Unit (CPU) for example.

The terminating device optical signal accommodation unit 115 is communicatively connected to the signal processing unit 112 to be paired via the N identification units 114 (114-1 to 114-N). The terminating device optical signal accommodation unit 115 is communicatively connected to the OLT 120 via the fiber-to-the-subscriber line section.

Note that the identification unit 114 identifies the user terminal 20 and the like based on a Logical Link Identifier (LLID), but this should not be construed in a limiting sense. For example, a configuration may be employed in which an identification unit that performs identification based on information different from LLID and the identification unit that performs identification based on LLID used in combination.

Configuration of OLT

Figure 4:
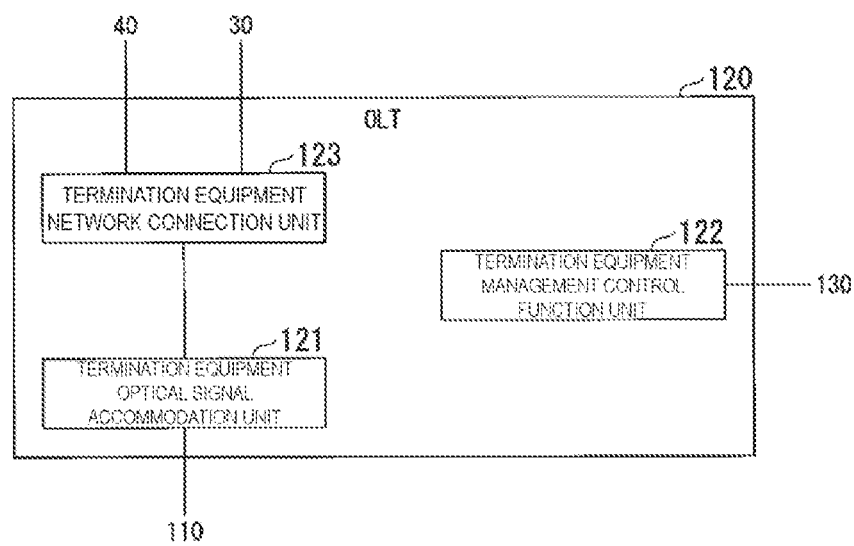
FIG. 4 is a block diagram illustrating a configuration of an OLT 120 of the fiber-to-the-subscriber line system 10 according to an embodiment of the present invention.

Hereinafter, the configuration of the OLT 120 will be described more in detail. FIG. 4 is a block diagram illustrating a configuration of the OLT 120 of the fiber-to-the-subscriber line system 10 according to an embodiment of the present invention. As illustrated in the figure, the OLT 120 is configured to include a termination equipment optical signal accommodation unit 121, an termination equipment management control function unit 122, and an termination equipment network connection unit 123.

The termination equipment optical signal accommodation unit 121 is communicatively connected to the ONU 110 via the fiber-to-the-subscriber line section. The termination equipment optical signal accommodation unit 121 is communicatively connected to the termination equipment network connection unit 123.

The termination equipment management control function unit 122 is communicatively connected to the operation management unit 130. The termination equipment management control function unit 122 is configured to include a processor such as a CPU for example.

The termination equipment network connection unit 123 is communicatively connected to the termination equipment optical signal accommodation unit 121. The termination equipment network connection unit 123 is also communicatively connected to the authentication device 30 and the Internet service server 40 via the network 50.

In the communication system 1 configured as described above, when the user terminal 20 is connected to the terminating device user terminal connection unit 111 of the ONU 110 via a wired or wireless medium, an authentication scheme starts in the communication system 1 for determining whether the user terminal 20 is allowed to be communicatively connected to the network.

The terminating device user terminal connection unit 111 of the ONU 110 notifies the authentication device 30 of the connection to the terminating device user terminal connection unit 111 by the user terminal 20, via the signal processing unit 112, the identification unit 114-1, terminating device optical signal accommodation unit 115, the fiber-to-the-subscriber line section, the termination equipment optical signal accommodation unit 121, the termination equipment network connection unit 123, and the network 50.

In response to receiving the notification from the ONU 110, the authentication device 30 determines whether the user terminal 20 is allowed to be communicatively connected to the network 50. This process is performed under an assumption that in the fiber-to-the-subscriber line section, the identification unit 114-1 is authenticated in advance for the communication with the termination equipment optical signal accommodation unit 121. Furthermore, it is assumed that a logical path is connected between the identification unit 114-1 and the termination equipment optical signal accommodation unit 121, via the terminating device optical signal accommodation unit 115 and the fiber-to-the-subscriber line section. Through this logical path, only transmission and reception for the fiber-to-the-subscriber line section communication authentication and user terminal authentication scheme are enabled.

Note that exchanging for a notification instruction system including the fiber-to-the-subscriber line section communication authentication is performed between the termination equipment management control function unit 122 of the OLT 120 and the terminating device management control function unit 113 of the ONU 110. Therefore, the above-described logical path is not limited to the connection with the identification unit 114-1. Still, it is only natural for the logical path described above to be connected between the identification unit 114-1 and the termination equipment optical signal accommodation unit 121.

The authentication device 30 determines whether the user terminal 20 is allowed to be communicatively connected to the network 50 based on connection information about the user terminal 20, in response to a notification from the fiber-to-the-subscriber line system 10.

Note that examples of the connection information about the user terminal 20 includes: terminal information such as a MAC address; information identifying the identification unit 114 of the ONU 110; information identifying a logical path and the termination equipment optical signal accommodation unit 121 of the OLT 120; a package number; a port number; an installation position of the user terminal 20; stored position information such as shelf number and building information; and the like. However, the connection information is not limited to these.

The authentication device 30 notifies the termination equipment management control function unit 122 of the OLT 120 of the result of determining whether the user terminal 20 is allowed to be communicatively connected to the network 50, via the operation management unit 130 of the fiber-to-the-subscriber line system 10.

When the notified determination result is that the connection is not allowed, the termination equipment management control function unit 122 notifies the terminating device management control function unit 113 of an indication that the connection is not allowed and a setting instruction for the signal processing unit 112, via the termination equipment optical signal accommodation unit 121, the fiber-to-the-subscriber line section, the terminating device optical signal accommodation unit 115, and the identification unit 114-1. The signal processing unit 112 notified of the indication that the connection is not allowed from the terminating device management control function unit 113 rejects the communicative connection of the user terminal 20 to the network 50.

When the notified determination result is that the connection is allowed, the termination equipment management control function unit 122 notifies the terminating device management control function unit 113 of an indication indicating that the connection is allowed, a virtual identification unit start instruction, and a setting instruction for the signal processing unit 112, via the termination equipment optical signal accommodation unit 121, the fiber-to-the-subscriber line section, the terminating device optical signal accommodation unit 115, and the identification unit 114-1. The terminating device management control function unit 113 notifies the identification unit 114-2 of an instruction to establish connection of a new logical path with the termination equipment optical signal accommodation unit 121. This logical path corresponds to the request from the user terminal 20 (such as a bandwidth, time zone, low latency, and path, for example).

When the identification unit 114-2 establishes the connection of the new logical path, the terminating device management control function unit 113 notifies the signal processing unit 112 of the signal processing unit setting. The signal processing unit 112 performs path switching so that the user terminal 20 can utilize the network service via the identification unit 114-2, and then allows the communicative connection of the user terminal 20 based on the signal processing unit setting.

As a result, only the user terminal 20 for which communicative connection is allowed can be communicatively connected to the Internet service server 40 via the identification unit 114-2, the terminating device optical signal accommodation unit 115, the fiber-to-the-subscriber line section, the termination equipment optical signal accommodation unit 121, the termination equipment network connection unit 123, and the network 50. Thus, only the user terminal 20 for which the communicative connection is allowed can start using the network service.

The termination equipment management control function unit 122 can allocate a bandwidth corresponding to a request from the user terminal 20 in a time zone corresponding to the request from the user terminal 20. Here, OpS such as a monitoring system, for example, can be used as the operation management unit 130 that executes processing of notifying the user terminal 20 of the result of determining whether the user terminal 20 can be communicatively connected to the network 50. However, this should not be construed in a limiting sense.

Note that the virtual identification unit that establishes connection of the new logical path with the termination equipment optical signal accommodation unit 121 is not limited to the identification unit 114-2. For example, a method of allocating from the identification unit 114-2 to the identification unit 114-N one by one in this order in accordance with the number of user terminals 20, a method of allocating a specific identification unit 114 to each of the user terminals 20 in advance, a method of determining the identification unit 114 for allocating the bandwidth requested from the user terminal 20 in the time zone requested by the user terminal 20, or the like may be employed.

Note that the identification unit 114 is a limited resource which is no less than two. Thus, for example, a configuration may be employed in which the upper limit of the number of the identification units 114 may be set, so as not to accept the user terminals 20 after the upper limit has been reached. With this configuration, enhancement of service, such as enabling the user terminals 20, for which the communicative connection is allowed, to use network services with higher priority or stability can be achieved.

Note that the authentication device 30 is notified of, for example, the stored position information as the connection information about the user terminal 20, when making the determination about whether the user terminal 20 is allowed to be communicatively connected to the network 50. The authentication device 30 can uniquely determine the target user terminal 20 based on the stored position information and terminal information. This makes it possible to guarantee the user terminal 20 to be connected through authentication with certainty.

In addition, for example, when the result of determining whether the user terminal 20 is allowed to be communicatively connected to the network 50 is notified with the stored position information linked to the authentication information, a physical path and a logical path are uniquely determined based on the authentication information and the stored position information. As a result, for example, when an unauthorized terminal attempts to connect to the network by using a fraudulent MAC address, the authentication device 30 can reject the connection by the unauthorized terminal based on the mismatch with the authentication information.

Examples of methods for uniquely determining the authentication information and the stored position information may include methods such as: a method in which the authentication device 30 holds in advance an access list that includes MAC address information, and the MAC address is checked each time to determine whether the communicative connection is allowed so that connection is rejected in a case where the MAC address is not included in the access list; a method in which a MAC address is acquired when determining whether the communicative connection is allowed, and connection from a different location but using this MAC address is not allowed; and a method in which, for example, an encryption key is distributed when connection is made after determining whether the communicative connection is allowed, to prevent connection from the user terminal 20 with the MAC address that is different from the user terminal 20 for which the connection has been allowed.

In any cases, the methods described above should not be construed in a limiting sense. Furthermore, a configuration may be obtained by combining one or a plurality of these methods. The above-described determination on whether the communicative connection is allowed, made by the authentication device 30, is particularly effective in to prevent fraudulent connection using the terminal information such as a MAC information.

In addition, because the physical path and the logical path can be uniquely determined from the authentication information and the stored position information, for example, when one user terminal 20 is communicatively connected to another user terminal 20, the authentication device 30 uniquely determines the physical path and the logical path from the other user terminal 20 to the one user terminal 20. Thus, the service enhancement can be achieved with performing a callback function for example, for calling back to the user terminal 20 that has issued a connection request to establish the connection.

Furthermore, in a connection target area related to the stored position information, one or a plurality of user terminals 20 may be allowed to be communicatively connected exclusively or simultaneously, for example, under one OLT 120. Thus, service enhancement can be achieved with services such as: a service in which the communicative connection can be freely established in an identical area once the user terminal is authenticated; a service such as handover in which the network connection by the user terminal 20 can seamlessly continue without interruption; a service with a closed Local Area Network (LAN) imposing limitation on other user terminals 20 that are unauthorized; and a redundancy service such as a service in which when one connection destination becomes unavailable, another connection destination becomes continuously available.

Note that, for example, the authentication status, the connection status, the user terminal information, or the like can be used as the authentication information described above, but the authentication information is not limited thereto. For example, a configuration may be employed in which one or a plurality of these types of information are be combined to be used as the authentication information.

Examples of the authentication status include conditions such as connection allowed, connection not allowed, and connection allowed conditionally. Examples of the connection status include connected, disconnected, connection standby, and temporarily disconnected. Examples of the user terminal information includes, terminal item, model, MAC address, Internet Protocol (IP) address, connection destination location, connection destination area, and authentication type. For example, a configuration may be employed in which one or a plurality of these types of information may be combined to be used as the authentication information.

Flow of Processing by Communication System Hereinafter, a flow of processing by the communication system 1 will be described.

Figure 5:
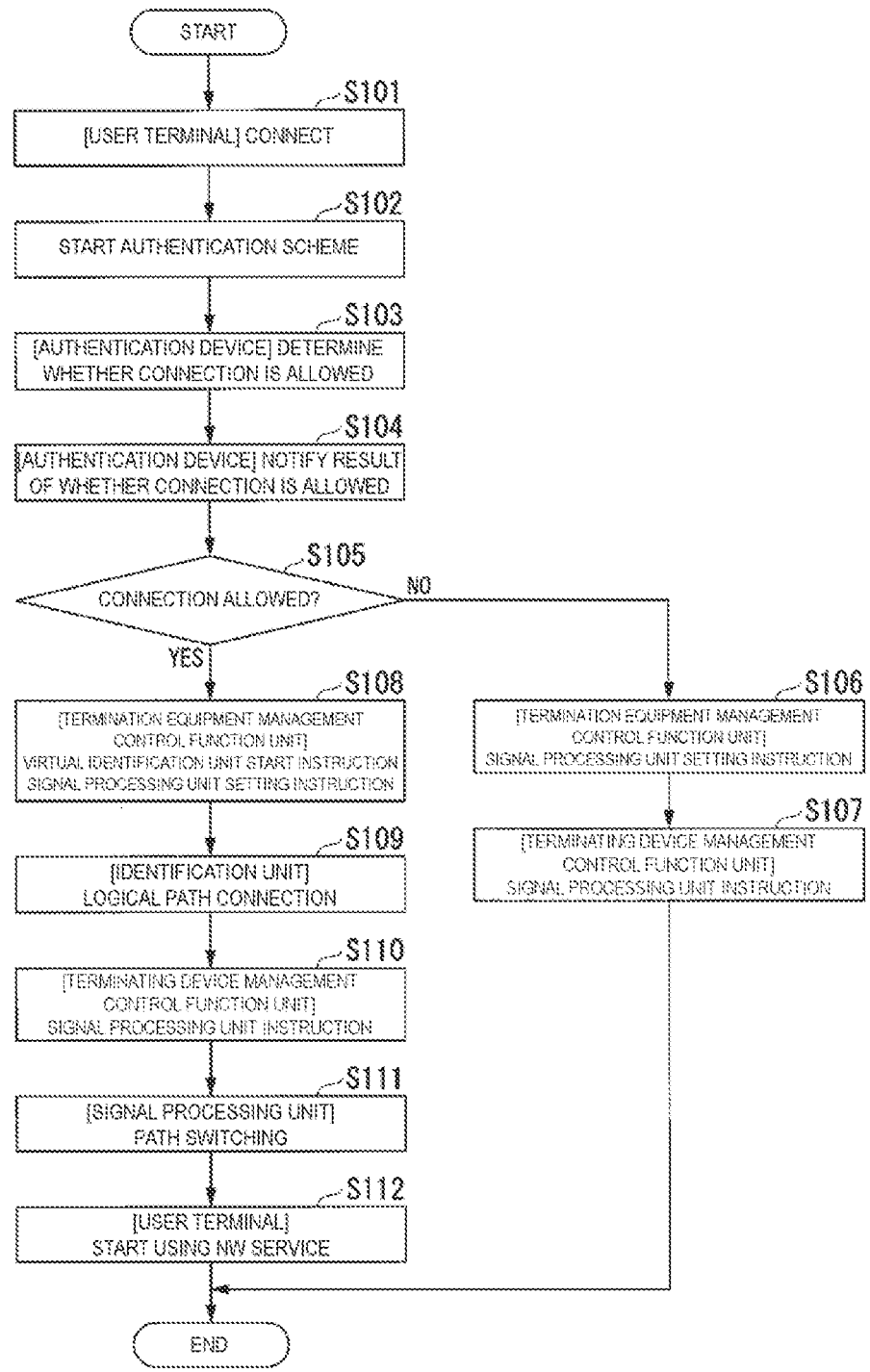
FIG. 5 is a flowchart illustrating an example of operations of the communication system 1 according to an embodiment of the present invention.

Authentication Basic Processing FIG. 5 is a flowchart illustrating a flow of authentication basic processing by the communication system 1.

When the user terminal 20 is connected to the terminating device user terminal connection unit 111 of the ONU 110 (step S101), an authentication scheme starts for determining whether the user terminal 20 is allowed to be connected to the network 50 (step S102).

Next, the authentication device 30 determines whether the connection is allowed based on the connection information about the user terminal 20 (step S103). Next, the authentication device 30 notifies the termination equipment management control function unit 122 of the OLT 120 of the result of determining whether the connection is allowed, via the operation management unit 130 (step S104).

The termination equipment management control function unit 122 acquires the result of determining whether the connection is allowed thus notified. In a case where the result of the determination is that connection is not allowed (No in step S105), the termination equipment management control function unit 122 notifies the terminating device management control function unit 113 of the ONU 110 of the result of the determination indicating that connection is not allowed as well as a setting instruction for the signal processing unit 112 of the ONU 110 (hereinafter, referred to as "signal processing unit setting instruction") (step S106).

Next, the terminating device management control function unit 113 notifies the signal processing unit 112 that the connection is not allowed and that the connection is rejected (step S107). Next, the signal processing unit 112 rejects the communicative connection of the user terminal 20. Then, the processing in the flowchart illustrated in FIG. 5 is ended.

Note that in this processing, in the signal processing unit 112, it may be natural to set in advance to reject connection in response to anything other than a signal for authentication scheme in the communicative connection from the user terminal 20 to the network 50. However, this should not be construed in a limiting sense.

When the determination result is that connection is allowed (Yes in step S105), the termination equipment management control function unit 122 notifies the terminating device management control function unit 113 of the result of determining that the connection is allowed as well as the start instruction for the virtual identification unit (hereinafter referred to as the "virtual identification unit start instruction") together with the signal processing unit setting instruction (step S108).

Next, the terminating device management control function unit 113 notifies the identification unit 114-2 of an instruction to establish the connection of a new logical path with the termination equipment optical signal accommodation unit 121 of the OLT 120. The identification unit 114-2 establishes the connection of the new logical path in response to the instruction notified (step S109).

Next, the terminating device management control function unit 113 notifies the signal processing unit 112 of the signal processing unit setting (step S110). Then, the signal processing unit 112 performs the path switching so that the user terminal 20 can use the network service via the identification unit 114-2 (step S111).

Thereafter, the signal processing unit 112 allows the communicative connection of the user terminal 20 based on the signal processing unit setting notified. As a result, with the communication system 1, only the user terminal 20 for which the communicative connection is allowed can be communicatively connected to the Internet service server 40 via the identification unit 114-2, the terminating device optical signal accommodation unit 115, the fiber-to-the-subscriber line section, the termination equipment optical signal accommodation unit 121, the termination equipment network connection unit 123, and the network 50. As a result, the user terminal 20 can start utilizing the network service (step S112).

Then, the processing in the flowchart illustrated in FIG. 5 is ended.

Re-Authentication Processing

Figure 6:
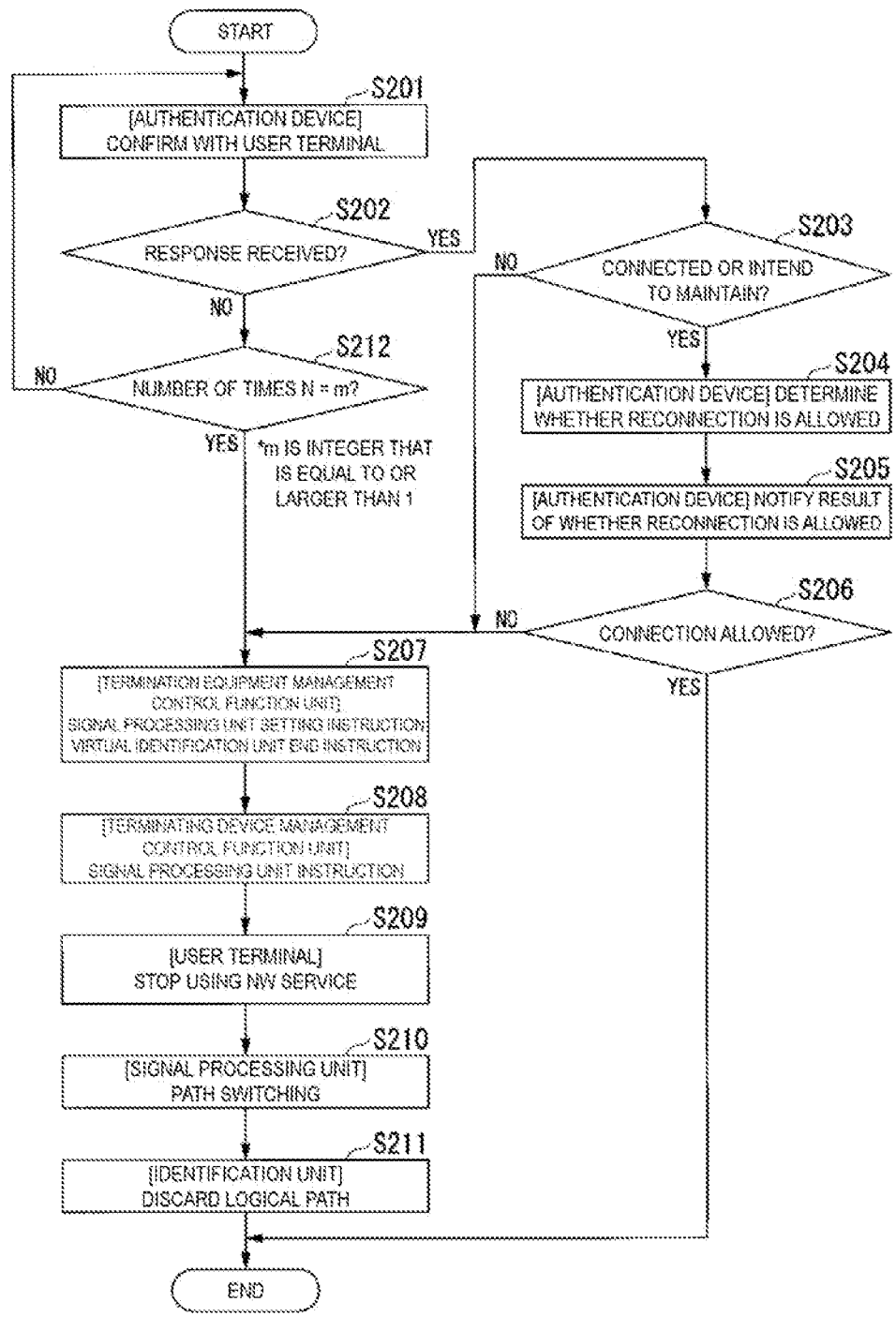
FIG. 6 is a flowchart illustrating an example of operations by the communication system 1 according to an embodiment of the present invention at the time of re-authentication.

FIG. 6 is a flowchart illustrating a flow of processing in a case where re-authentication is performed in addition to the authentication basic processing illustrated in FIG. 5.

The authentication device 30 confirms the connection status of the user terminal 20 at a predetermined timing (step S201). Here, the predetermined timing and an interval between the predetermined timings may be arbitrarily set.

When the user terminal 20 returns a response for the confirmation of the connection status and the response indicates that the connection status is to be maintained (Yes in step S202 and Yes in step S203), the authentication device 30 determines whether the reconnection is allowed based on the connection information about the user terminal 20 (step S204). Next, the authentication device 30 notifies the termination equipment management control function unit 122 of the OLT 120 of the result of determining whether the reconnection is allowed, via the operation management unit 130 (step S205).

The termination equipment management control function unit 122 acquires the result of determining whether the connection is allowed thus notified. When the determination result is that the connection is not allowed (No in step S206), the termination equipment management control function unit 122 notifies the terminating device management control function unit 113 of the ONU 110 of the determination result indicating that the connection is not allowed together with the signal processing unit setting instruction and a termination instruction for the virtual identification unit (hereinafter, referred to as "virtual identification unit termination instruction") (step S207).

Next, the terminating device management control function unit 113 notifies the signal processing unit 112 of the signal processing unit instruction (step S208). Next, the user terminal 20 ends the use of the network service (step S209). Next, the signal processing unit 112 performs path switching to enable passage for the fiber-to-the-subscriber line section communication authentication and the user terminal authentication scheme only (step S210). Next, the identification unit 114-2 discards the logical path, the connection of which has been established with the termination equipment optical signal accommodation unit 121 (step S211). Thus, the communicative connection is ended. As described above, the process of the flowchart illustrated in FIG. 6 is ended.

When the determination result is that the connection is allowed (Yes in step S206), the connection is maintained. As described above, the process of the flowchart illustrated in FIG. 6 is ended.

On the other hand, when the user terminal 20 returns a response for the confirmation of the connection status and the response indicates to switch the connection status to a disconnected state (Yes in step S202 and No in step S203), the user terminal 20 is notified that the connection is not allowed, and the connection is rejected. Thus, a processing flow similar to that in the case of the connection rejection described above (steps S207 to S211) is performed.

On the other hand, when the user terminal 20 does not return a response for the confirmation of the connection status and the number of times N the confirmation has met with no response is smaller than a predetermined number of times m (m being any integer equal to or larger than 1) (No in step S202 and No in step S212), the authentication device 30 performs the confirmation for the user terminal 20 again (step S201).

Furthermore, when the user terminal 20 does not return a response for the confirmation of the connection status and the number of times N the confirmation has met with no response reaches the predetermined number of times m (No in step S202 and Yes in step S212), the user terminal 20 is regarded as not being in communicative connection, and processing that is the same as that in the case described above where the communicative connection is rejected is executed. Thus, a processing flow similar to that in the case of the connection rejection described above (steps S207 to S211) is performed.

As described above, the process of the flowchart illustrated in FIG. 6 is ended.

Note that the end of the use of the network service by the user terminal 20, the path switching by the signal processing unit 112, and the discarding of the logical path by the identification unit 114-1 are not limited to the above-described processing flow, and the processing flow can be rearranged.

The periodical or random confirmation of the connection status of the user terminal 20 by the authentication device 30 enables substantial management of the network operation, and is effective in terms of network operation efficiency, that is, effective toward increase in the types and the number of the user terminals 20 in particular.

Modification of Re-Authentication Processing

Figure 7:
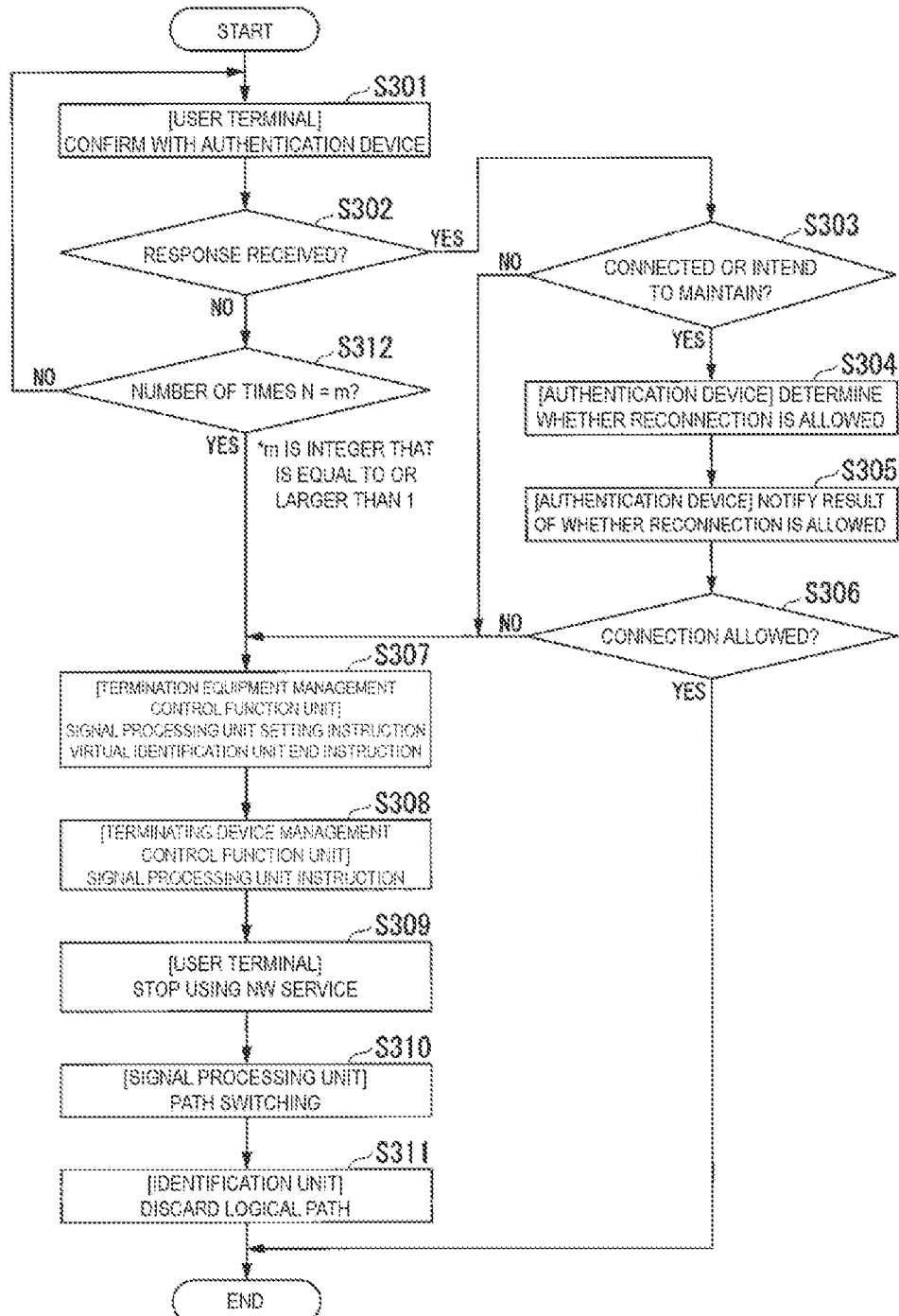
FIG. 7 is a flowchart illustrating an example operation by the communication system 1 according to an embodiment of the present invention at the time of re-authentication.

FIG. 7 is a flowchart illustrating the flow of other re-authentication processes different from the re-authentication process shown in FIG. 6.

The user terminal 20 requests the authentication device 30 for the connection status at a predetermined timing (step S301). Here, the predetermined timing and an interval between the predetermined timings are arbitrarily set.

When the authentication device 30 returns a response for the confirmation of the connection status and the response indicates that the connection status is to be maintained (Yes in step S302 and Yes in step S303), the authentication device 30 determines whether the reconnection is allowed based on the connection information about the user terminal 20 (step S304). Next, the authentication device 30 notifies the termination equipment management control function unit 122 of the OLT 120 of the result of determining whether the reconnection is allowed, via the operation management unit 130 (step S305).

The termination equipment management control function unit 122 acquires the result of determining whether the connection is allowed thus notified. When the determination result is that the connection is not allowed (No in step S306), the termination equipment management control function unit 122 notifies the terminating device management control function unit 113 of the ONU 110 of the determination result and rejects the connection. The termination equipment management control function unit 122 notifies the terminating device management control function unit 113 of the signal processing unit setting instruction and the virtual identification unit end instruction (step S307).

Next, the terminating device management control function unit 113 notifies the signal processing unit 112 of the signal processing unit instruction (step S308). Next, the user terminal 20 ends the use of the network service (step S309). Next, the signal processing unit 112 performs path switching to enable passage for the fiber-to-the-subscriber line section communication authentication and the user terminal authentication scheme only (step S310). Next, the identification unit 114-2 discards the logical path, the connection of which has been established with the termination equipment optical signal accommodation unit 121 (step S311). Thus, the communicative connection is ended.

Then, the processing in the flowchart illustrated in FIG. 7 is ended.

When the determination result is that the connection is allowed (Yes in step S306), the connection is maintained. Then, the processing in the flowchart illustrated in FIG. 7 is ended.

On the other hand, when the user terminal 20 returns a response for the confirmation of the connection status and the response indicates that the communicative connection is to be ended (Yes in step S302 and No in step S303), the user terminal 20 is notified that the connection is not allowed, and the communicative connection is rejected. That is, a processing flow similar to that in the case of the connection rejection described above (steps S307 to S311) is performed.

On the other hand, when the user terminal 20 does not return a response for the confirmation of the connection status and the number N of times the confirmation has met with no response is smaller than the predetermined number of times m (m being any integer equal to or larger than 1)

(No in step S302 and No in step S312), the user terminal 20 performs the confirmation for the authentication device 30 again (step S301).

Furthermore, when the user terminal 20 does not return a response for the confirmation of the connection status and the number of times N the confirmation has met with no response reaches the predetermined number of times m (No in step S302 and Yes in step S312), the authentication device 30 is regarded as not being in communicative connection. Thus, a processing flow similar to that in the case of the connection rejection described above (steps S307 to S311) is performed.

Then, the processing in the flowchart illustrated in FIG. 7 is ended.

Note that the end of the use of the network service by the user terminal 20, the path switching by the signal processing unit 112, and the discarding of the logical path by the identification unit 114-1 are not limited to the above-described processing flow, and the processing flow can be rearranged.

The confirmation of the connection status of the authentication device 30 by the user terminal 20 is effective in terms of network operation efficiency, that is, effective toward increase in the types and the number of the user terminals 20 in particular.

Figure 8:
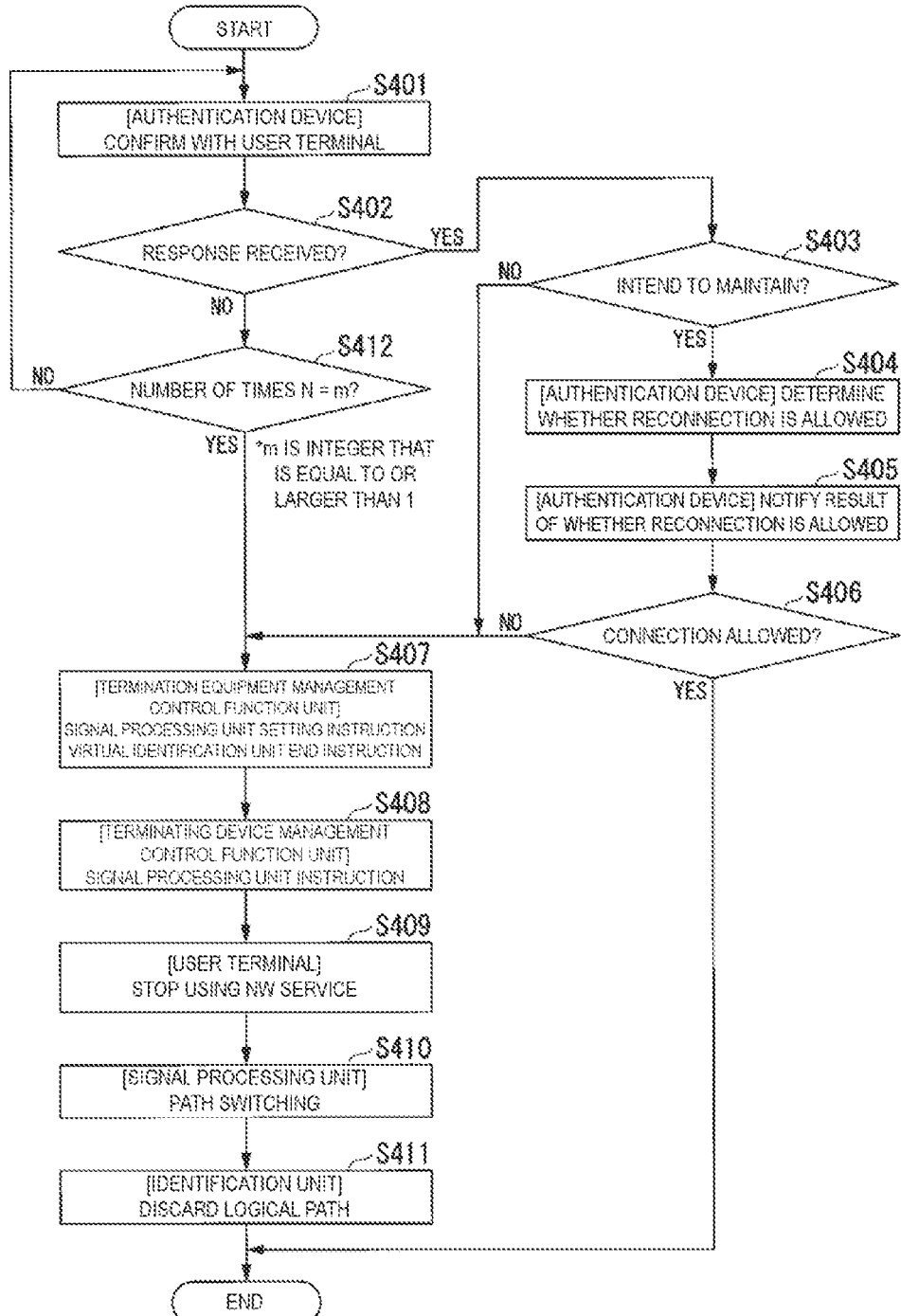
FIG. 8 is a flowchart illustrating an example of operations by the communication system 1 according to an embodiment of the present invention at the time of ending the communication.

Ending Processing FIG. 8 is a flowchart illustrating a flow of processing executed in a case where communicative connection is ended in addition to the authentication basic processing illustrated in FIG. 5.

The authentication device 30 confirms an intention of the user terminal 20 to maintain the connection status at a predetermined timing (step S401). Here, the predetermined timing and an interval between the predetermined timings may be arbitrarily set.

When the user terminal 20 returns a response for the confirmation of the intention to maintain the connection status and the response indicates the intention to maintain the connection status (Yes in step S402 and Yes in step S403), the authentication device 30 determines whether the reconnection is allowed based on the connection information about the user terminal 20 (step S404). Next, the authentication device 30 notifies the termination equipment management control function unit 122 of the OLT 120 of the result of determining whether the reconnection is allowed, via the operation management unit 130 (step S405).

The termination equipment management control function unit 122 acquires the result of determining whether the connection is allowed thus notified. When the determination result is that the connection is not allowed (No in step S406), the termination equipment management control function unit 122 notifies the terminating device management control function unit 113 of the ONU 110 of the determination result indicating that the connection is not allowed together with the signal processing unit setting instruction and the virtual identification unit end instruction (step S407).

Next, the terminating device management control function unit 113 notifies the signal processing unit 112 of the signal processing unit instruction (step S408). Next, the user terminal 20 ends the use of the network service (step S409). Next, the signal processing unit 112 performs path switching to enable passage for the fiber-to-the-subscriber line section communication authentication and the user terminal authentication scheme only (step S410). Next, the identification unit 114-2 discards the logical path, the connection of which has been established with the termination equipment optical signal accommodation unit 121 (step S411). Thus, the communicative connection is ended.

Then, the processing in the flowchart illustrated in FIG. 8 is ended.

When the determination result is that the connection is allowed (Yes in step S406), the connection is maintained. Then, the processing in the flowchart illustrated in FIG. 8 is ended.

On the other hand, when the user terminal 20 returns a response for the confirmation of the connection status and the response indicates an intention that the connected status is not to be maintained but is to be ended (Yes in step S402 and No in step S403), the user terminal 20 is notified that the connection is not allowed, and the communicative connection is rejected. Thus, a processing flow similar to that in the case of the connection rejection described above (steps S407 to S411) is performed.

On the other hand, when the user terminal 20 does not return a response for the confirmation of the connection status and the number of times N the confirmation has met with no response is smaller than the predetermined number of times m (m being any integer equal to or larger than 1) (No in step S402 and No in step S412), the authentication device 30 performs the confirmation for the user terminal 20 again (step S401).

Furthermore, when the user terminal 20 does not return a response for the confirmation of the connection status and the number of times N the confirmation has met with no response reaches the predetermined number of times m (No in step S402 and Yes in step S412), the user terminal 20 is regarded as not being in communicative connection. Thus, a processing flow similar to that (steps S407 to S411) in the case of the connection rejection described above is performed.

Then, the processing in the flowchart illustrated in FIG. 8 is ended.

Note that the end of the use of the network service by the user terminal 20, the path switching by the signal processing unit 112, and the discarding of the logical path by the identification unit 114-1 are not limited to the above-described processing flow, and the processing flow can be rearranged.

The periodical or random confirmation of the connection status of the user terminal 20 by the authentication device 30 enables substantial management of the network operation, and is effective in terms of network operation efficiency, that is, effective toward increase in the types and the number of the user terminals 20 in particular.

Modification of Ending Processing

Figure 9:
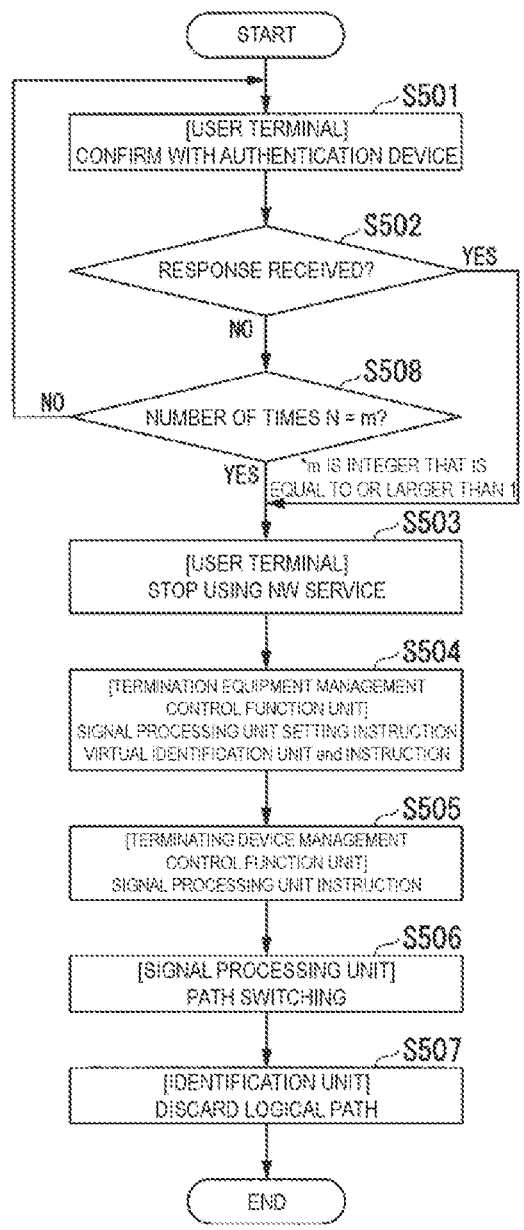
FIG. 9 is a flowchart illustrating an example of operations by the communication system 1 according to an embodiment of the present invention at the time of ending the communication.

FIG. 9 is a flowchart illustrating the flow of another ending processing different from the ending processing illustrated in FIG. 8.

The user terminal 20 confirms an intention of the authentication device 30 to maintain the communicative connection at a predetermined timing (step S501). Here, the predetermined timing and an interval between predetermined timings may be arbitrarily set.

When the authentication device 30 returns a response for the confirmation for the intention to maintain the communicative connection (Yes in step S502) and the response indicates the intention to maintain the connection, the processing that is the same as that in the case of the re-authentication flow is executed, and thus the description thereof will be omitted.

When the authentication device 30 returns a response indicating an intention to end the communicative connection instead of maintaining it (Yes in step S502), the user terminal 20 ends the usage of the network service at a predetermined timing (step S503).

The termination equipment management control function unit 122 notifies the terminating device management control function unit 113 of the ONU 110 of the signal processing unit setting instruction and the virtual identification unit end instruction (step S504).

Next, the terminating device management control function unit 113 notifies the signal processing unit 112 of the signal processing unit instruction (step S505). Next, the signal processing unit 112 performs path switching to enable passage for the fiber-to-the-subscriber line section communication authentication and the user terminal authentication scheme only (step S506). Next, the identification unit 114-2 discards the logical path, the connection of which has been established with the termination equipment optical signal accommodation unit 121 (step S507). Thus, the communicative connection is ended.

Then, the processing in the flowchart illustrated in FIG. 9 is ended.

On the other hand, when the number of times N the confirmation has met with no response from the user terminal 20 for the confirmation of the intention to maintain the communicative connection is smaller than the predetermined number of times m (m being any integer equal to or larger than 1) (No in step S502 and No in step S508), the user terminal 20 performs the confirmation for the authentication device 30 again (step S501).

Furthermore, when the number of times N the confirmation has met with no response from the user terminal 20 for the confirmation of the intention to maintain the communicative connection reaches the predetermined number of times m (No in step S502 and Yes in step S508), the user terminal 20 is regarded as not being in communicative connection. Thus, a processing flow similar to that in the case of the communicative connection end described above (steps S503 to S507) is performed.

The periodical or random confirmation of the intention to maintain or end the connected state of the communicative connection to the authentication device 30 by the user terminal 20 enables substantial management of the network operation, and is effective in terms of network operation efficiency, that is, effective toward increase in the types and the number of the user terminals 20 in particular.

Processing Executed when User Terminal Switches Connection Destination

Figure 10:
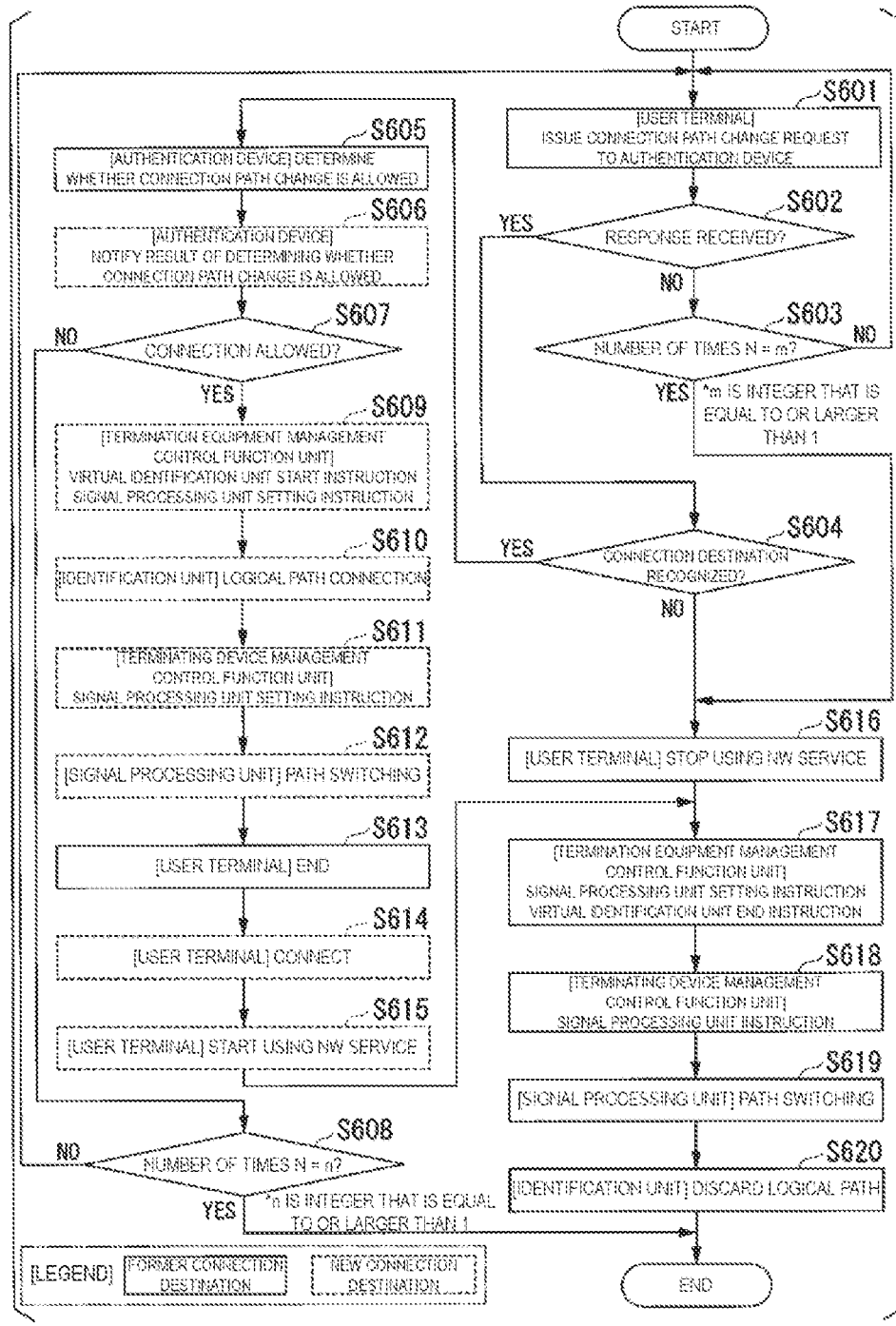
FIG. 10 is a flowchart illustrating an example of operations by the communication system 1 according to an embodiment of the present invention at the time of connection destination switching.
Figure 11:
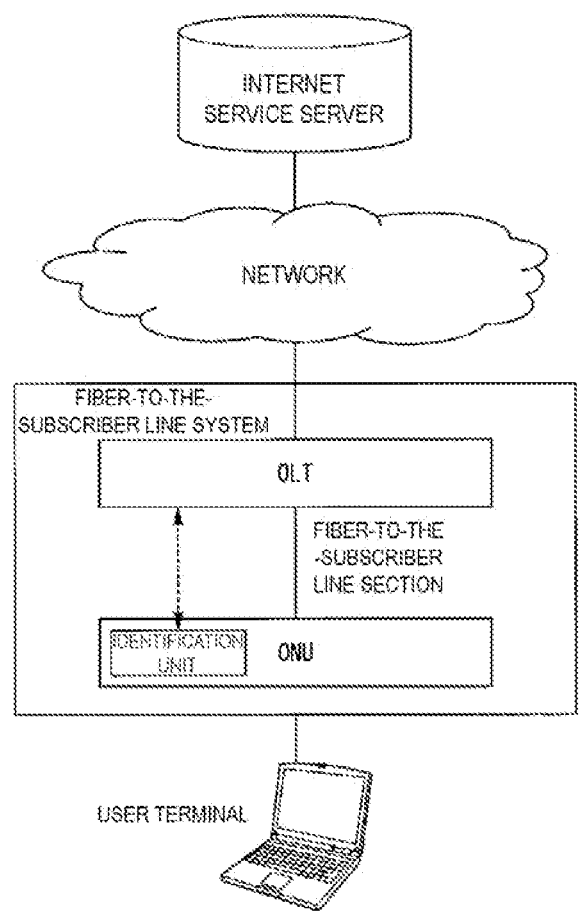
FIG. 11 is a schematic diagram illustrating a configuration of a known communication system.

FIG. 10 is a flowchart illustrating a flow of processing in a case where the user terminal 20 switches a connection destination executed in addition to the authentication basic processing illustrated in FIG. 5.

The user terminal 20 requests the authentication device 30 to change the connection path at a predetermined timing (step S601). Here, the predetermined timing and an interval between the predetermined timings may be arbitrarily set.

Next, when the authentication device 30 does not return a response for the connection path change request and the number of times N the request has met with no response is smaller than the predetermined number of times m (m being any integer equal to or larger than 1) (No in step S602 and No in step S603), the user terminal 20 issues the connection path change request to the authentication device 30 again (step S601).

Furthermore, when the authentication device 30 does not return a response for the connection path change request and the number N of times the request has met with no response reaches the predetermined number of times m (No in step S602 and Yes in step S603), the user terminal 20 is regarded as not being in communicative connection. The user terminal 20 is notified that the connection is not allowed, and the user terminal 20 ends the use of the network service (step S616).

Next, the termination equipment management control function unit 122 notifies the terminating device management control function unit 113 of the signal processing unit setting instruction and the virtual identification unit end instruction (step S617). Next, the terminating device management control function unit 113 notifies the signal processing unit 112 of the signal processing unit instruction (step S618). Next, the signal processing unit 112 performs path switching to enable passage for the fiber-to-the-subscriber line section communication authentication and the user terminal authentication scheme only (step S619). Next, the identification unit 114-2 discards the logical path, the connection of which has been established with the termination equipment optical signal accommodation unit 121 (step S620). Thus, the communicative connection is ended.

Then, the processing in the flowchart illustrated in FIG. 10 is ended.

When the authentication device 30 returns a response for the connection path change request with the connection destination not recognized (Yes in steps S602, and No in step S604), the basic processing flow related to authentication needs to be performed again at the new connection destination. Thus, the processing flow in the case of ending the communicative connection at the current connection destination, that is, a processing flow as in the processing in step S616 to step S620 described above is performed. Then, the processing in the flowchart illustrated in FIG. 10 is ended.

Note that in a case that the connection destination is recognized and the user terminal 20 continuously use the network services while switching between the connection destinations, two methods can be employed as typical examples for the processing flow. One of the methods is a combination of the processing flow for the ending and the basic processing flow related to the authentication. Description on this method will be omitted herein. The other processing flow will be described below.

Note that, as illustrated in the legend in FIG. 10, of the steps illustrated in FIG. 10, the steps indicated by the solid line represents processing executed in the current connection destination (hereinafter, referred to as "former connection destination"). The steps indicated by the dashed line represent the processing executed at the connection destination newly connected (hereinafter referred to as "new connection destination").

When the authentication device 30 returns a response to the connection path change request with the connection destination recognized (Yes in steps S602, and Yes in step S604), the authentication device 30 determines whether the connection path change is allowed based on the connection information about the new connection (step S605). Next, the authentication device 30 notifies the termination equipment management control function unit 122 of the OLT 120 at the new connection destination and the termination equipment management control function unit 122 of the OLT 120 at the former connection destination of the result of determining whether the connection path change is allowed (step S606).

When the result of determining whether the connection path change is allowed, notified from the authentication device 30, is that the connection is not allowed and the number of times N which is the result of determining whether the connection path change is allowed has been that the connection is not allowed is smaller than a predetermined number of times n (n being any integer not smaller than 1) (No in step S607 and No in step S608), the user terminal 20 issues the connection path change request to the authentication device 30 again (for example, due to saturation of the connection status at the new connection destination) (step S601).

When the result of determining whether the connection path change, notified from the authentication device 30, is that the connection is not allowed and the number of times N which is the result of determining whether the connection path change is allowed has been that the connection is not allowed reaches the predetermined number of times n (No in step S607 and No in step S608), the user terminal 20 issues the connection path change request to the authentication device 30 again (for example, due to determination that the user terminal 20 has no chance of being connected to the new connection destination). Then, the processing in the flowchart illustrated in FIG. 10 is ended.

When the result of determining whether the connection path change is allowed, notified from the authentication device 30, is that the connection is allowed (Yes in step S607), the termination equipment management control function unit 122 of the OLT 120 as the new connection destination is notified of the result of determining whether the connection path change is allowed, via the operation management unit 130 based on the connection information about the former connection destination. In response to the determination result indicating that the connection is allowed thus notified, the termination equipment management control function unit 122 notifies the terminating device management control function unit 113 of the new connection destination, of the determination result indicating that the connection is allowed as well as the virtual identification unit start instruction and the signal processing unit setting instruction (step S609).

Next, the terminating device management control function unit 113 of the new connection destination notifies the identification unit 114-2 of the new connection destination, of an instruction to establish the connection of a new logical path with the termination equipment optical signal accommodation unit 121 of the new connection destination. As a result, the identification unit 114-2 of the new connection destination establishes connection of a new logical path (step S610).

Next, the terminating device management control function unit 113 of the new connection destination notifies the signal processing unit 112 of the new connection destination of the signal processing unit setting instruction (step S611). Then, the signal processing unit 112 of the new connection destination performs the path switching so that the user terminal 20 can utilize the network service via the identification unit 114-2 of the new connection destination (step S612).

Next, connection of the user terminal 20 is allowed based on the signal processing unit setting at the new connection destination, and the user terminal 20 allowed to be in connection can only be in connection with the Internet service server 40 via the identification unit 114-2 of the new connection destination, the terminating device optical signal accommodation unit 115 of the new connection destination, fiber-to-the-subscriber line section to the new connection destination, the termination equipment optical signal accommodation unit 121 of the new connection destination, the termination equipment network connection unit 123 of the new connection destination, and the network 50 of the new connection destination.

In response to being allowed to be in connection, the user terminal 20 ends the communicative connection with the former connection destination (step S613) and establishes connection with the new connection destination (step S614).

Note that, as soon as the user terminal 20 is connected to the new connection destination (step S614) after the path switching to the new connection destination (step S612) has been performed, the user terminal 20 can start using the network service (step S615).

As described above, when the new connection destination is recognized, for example, the connection to the network service can be established faster compared with the case where the new connection destination is not recognized, considering the time required for entirely processing the processing flow for the terminating and the authentication basic flow. Furthermore, there is a particular advantage in terms of usability, due to factors such as the network service being seamlessly usable with no disconnection at the time of switching.

Next, a processing flow at the former connection destination is performed (steps S617 to S620). Thus, the communicative connection is ended.

Then, the processing in the flowchart illustrated in FIG. 10 is ended.

Furthermore, after the user terminal 20 has established the communicative connection with the network 50 via the new connection destination, the processing flow after the signal processing unit setting instruction and the virtual identification unit end instruction by the termination equipment management control function unit 122 at the former connection destination can be swiftly executed. When there are many other user terminals 20, a large amount of communicative connection requests are issued. Thus, swift end of the logical path results in higher efficiency and effective network service.

As described above, in the communication system 1 according to the above-described embodiment, the fiber-to-the-subscriber line system 10 is provided with the authentication device 30 that determines whether the user terminal 20 is allowed to be communicatively connected to the fiber-to-the-subscriber line system 10 via the network 50. Then, based on the result of the determination of whether the connection is allowed by the authentication device 30, control (such as notification and setting) is performed for establishing or terminating the communicative connection in the fiber-to-the-subscriber line system 10.

With the above-described configuration, according to the communication system 1 of the above-described embodiment, it is possible to provide, only the connection authorized user terminal 20 can be provided with network service allocated with a requested bandwidth within a requested time zone. Thus, the communication system 1 according to the embodiment described above can dynamically allocate a bandwidth in response to the request.

Furthermore, in the communication system 1 according to the above-described embodiment, periodic communications (polling) are performed between the authentication device 30 and the user terminal 20, so that the authentication device 30 periodically determines whether communicative connection can be reestablished. As described above with reference to FIG. 5, the periodic communications are performed through confirmation of the communicative connection request from the user terminal 20, from the authentication device 30 to the user terminal 20. Alternatively, as described above with reference to FIG. 6, the periodic communications are performed, for example, with the user terminal 20 periodically requesting the authentication device 30 for determination on whether the communicative connection is allowed.

The periodical confirmation of the connected state by the user terminal 20 enables substantial management of the network operation, and is effective in terms of network operation efficiency, that is, effective toward increase in the types and the number of the user terminals 20 in particular, as described above.

Note that, for example, the user terminal 20 and the authentication device 30 in the above-described embodiment can be performed by a computer and a program. In this case, the computer may be configured to acquire and execute a program recorded on the recording medium, or may be configured to execute a program provided via a network.

All or a part of the communication system 1 according to the above-described embodiment may be performed by a computer. In such a case, program for performing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for performing a part of the above-mentioned functions. The above program may be a program capable of performing the above-mentioned functions in combination with another program already recorded in a computer system. The above program may be a program to be performed with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

1 . . . Communication system
10 . . . Fiber-to-the-subscriber line system
20 . . . User terminal
30 . . . Authentication device
40 . . . Internet service server
50 . . . Network
110 . . . ONU
111 . . . Terminating device user terminal connection unit
112 . . . Signal processing unit
113 . . . Terminating device management control function unit
114 . . . Identification unit
115 . . . Terminating device optical signal accommodation unit
120 . . . OLT
121 . . . Termination equipment optical signal accommodation unit
122 . . . Termination equipment management control function unit
123 . . . Termination equipment network connection unit
130 . . . Operation management unit

The invention claimed is:

1. A communication method of an optical communication system for causing a processor to execute a process, the communication method comprising executing on the processor the steps of:
sending, by a user terminal, a connection request for establishing a communicative connection with a network to an ONU;
sending, by the ONU, the connection request to an OLT through a fiber-to-subscriber-line;
sending, by the OLT, the connection request to an authentication device;
determining, by the authentication device, whether the user terminal is allowed to establish the communicative connection with the network in response to the connection request;
notifying, by the authentication device, a determination result to the OLT and the ONU;
rejecting, by the OLT and the ONU, the establishment of the communicative connection with the network by the user terminal when the determination result indicates a state in which the connection request for establishing the communicative connection with the network by the user terminal is denied; and
controlling, by the OLT and the ONU, the establishment of the communicative connection with the network by the user terminal, by dynamically allocating a bandwidth in accordance with another request from the user terminal when the determination result indicates a state in which the connection request for establishing the communicative connection with the network by the user terminal is allowed.

2. The communication method according to claim 1, further comprising performing periodical execution of the sending by a user terminal, the sending by the ONU, the sending by the OLT, the determining by the authentication device, the notifying by the authentication device, and either of the rejecting or the controlling.

3. The communication method according to claim 2, wherein the performing periodical execution is executed in response to the authentication device periodically confirming the user terminal about the connection request for establishing the communicative connection by the user terminal.

4. The communication method according to claim 2, wherein the performing periodical execution is executed in response to the user terminal periodically sending the connection request toward the authentication device for determining whether the communicative connection is allowed.

5. The communication method according to claim 1,
wherein the connection request includes connection information of the user terminal, and
the connection information includes a MAC address of the user terminal, information identifying a first component of the ONU, information identifying a logical path and a second component of the OLT, and an installation location of the user terminal.

6. The communication method according to claim 1,
wherein the another request relates to a value of a communication parameter with respect to a requesting bandwidth, a time zone, a low latency level, and a communication path.

7. A communication system comprising:
a subscriber line system including an ONU, an OLT, and a fiber-to-subscriber-line connecting between the ONU and the OLT, the ONU being connected to a user terminal;
an authentication device configured to control a communicative connection between the user terminal and a network;
a memory configured to store a program; and
a processor configured to execute the program so as to:
  cause the user terminal to send a connection request for establishing the communicative connection with the network to the ONU;
  cause the ONU to send the connection request to the OLT through the fiber-to-subscriber-line;
  cause the OLT to send the connection request to the authentication device;
  cause the authentication device to determine whether the user terminal is allowed to establish the communicative connection with the network in response to the connection request;
  cause the authentication device to notify a determination result to the subscriber line system;
  cause the subscriber line system to reject the establishment of the communicative connection with the network by the user terminal when the determination result indicates a state in which the connection request for establishing the communicative connection with the network by the user terminal is denied; and
  cause the subscriber line system to control the establishment of the communicative connection with the network by the user terminal, by dynamically allocating a bandwidth in accordance with another request from the user terminal when the determination result indicates a state in which the connection request for establishing the communicative connection with the network by the user terminal is allowed.

8. The communication system according to claim 7,
wherein the connection request includes connection information of the user terminal, and
the connection information includes a MAC address of the user terminal, information identifying a first component of the ONU, information identifying a logical path and a second component of the OLT, and an installation location of the user terminal.

9. The communication system according to claim 7,
wherein the another request relates to a value of a communication parameter with respect to a requesting bandwidth, a time zone, a low latency level, and a communication path.

10. An authentication device, comprising:
a memory configured to store a program; and
a processor configured to execute the program so as to:
  receive a connection request for establishing a communicative connection with a network from a user terminal via an ONU, a fiber-to-subscriber-line, and an OLT, the fiber-to-subscriber-line connecting between the ONU and the OLT, the ONU being connected to the user terminal;
  determine whether the user terminal is allowed to establish the communicative connection with the network in response to the connection request;
  notify a determination result to the OLT and the ONU;
  cause the OLT and the ONU to reject the establishment of the communicative connection with the network by the user terminal when the determination result indicates a state in which the authentication device denies the connection request for establishing the communicative connection with the network by the user terminal; and
  cause the OLT and the ONU to control the establishment of the communicative connection with the network by the user terminal, by dynamically allocating a bandwidth in accordance with another request from the user terminal when the determination result indicates a state in which the authentication device allows the connection request for establishing the communicative connection with the network by the user terminal.

11. The authentication device according to claim 10,
wherein the connection request includes connection information of the user terminal, and
the connection information includes a MAC address of the user terminal, information identifying a first component of the ONU, information identifying a logical path and a second component of the OLT, and an installation location of the user terminal.

12. The authentication device according to claim 10,
wherein the another request relates to a value of a communication parameter with respect to a requesting bandwidth, a time zone, a low latency level, and a communication path.

* * * * *